(12) United States Patent
Sutter et al.

(10) Patent No.: US 12,319,430 B2
(45) Date of Patent: Jun. 3, 2025

(54) AERONAUTICAL DEVICE FOR DISTRIBUTING GAS

(71) Applicant: ARESIA-VILLENEUVE, Villeneuve la Garenne (FR)

(72) Inventors: Xavier Sutter, Villeneuve la Garenne (FR); Jean-Christophe Bertolo, Villeneuve la Garenne (FR); Pascal Legrand, Villeneuve la Garenne (FR); Florin-Calin Paun, Villeneuve la Garenne (FR); Nicolas Walker, Villeneuve la Garenne (FR)

(73) Assignee: Aresia-Villeneuve, Villeneuve la Garenne (FR)

( * ) Notice: Subject to any disclaimer, the term of this patent is extended or adjusted under 35 U.S.C. 154(b) by 0 days.

(21) Appl. No.: 18/846,742

(22) PCT Filed: Mar. 9, 2023

(86) PCT No.: PCT/FR2023/050321
§ 371 (c)(1),
(2) Date: Sep. 13, 2024

(87) PCT Pub. No.: WO2023/175261
PCT Pub. Date: Sep. 21, 2023

(65) Prior Publication Data
US 2025/0128825 A1    Apr. 24, 2025

(30) Foreign Application Priority Data
Mar. 14, 2022  (FR) ..................................... 2202235

(51) Int. Cl.
| B64D 37/30 | (2006.01) |
| F02C 3/22  | (2006.01) |
| F02C 7/232 | (2006.01) |

(52) U.S. Cl.
CPC ................. *B64D 37/30* (2013.01); *F02C 3/22* (2013.01); *F02C 7/232* (2013.01)

(58) Field of Classification Search
CPC ............ B64D 37/30; F02C 3/22; F02C 7/232
See application file for complete search history.

(56) References Cited

U.S. PATENT DOCUMENTS 3,088,592 A * 5/1963 Clark ........................ G05D 9/12
                                                        210/114
3,289,842 A * 12/1966 Richards ................ B01D 37/02
                                                        210/138

(Continued)

FOREIGN PATENT DOCUMENTS

| CN | 104903196 | 9/2015 |
| CN | 104948302 | 9/2015 |

(Continued)

OTHER PUBLICATIONS

International Patent Application No. PCT/FR2023/050321, filed Mar. 9, 2023; International Search Report / Written Opinion issued Jun. 13, 2023; 13 pages, English language translation included.

*Primary Examiner* — Patrick C Williams
(74) *Attorney, Agent, or Firm* — Mueting Raasch Group

(57) ABSTRACT

Aeronautical device 1 for distributing gas in an aircraft between at least one source 2 of liquefied gas and at least one gas consumer member 3, comprising at least one first controlled all-or-nothing valve 11 at the output of each source 2 of liquefied gas, a cryogenic distributor 5 connected to each first controlled valve 11 and supplied with liquid, second controlled all-or-nothing valves 12 connected to the cryogenic distributor 5, in parallel, two-phase buffer reservoirs 7 supplied with liquid, each via one of the second controlled valves, and supplying gas, third controlled valves 13 mounted at the output of each buffer reservoir 7, for supplying gas, a pressure-reducing valve 9 mounted at the (Continued)

output of the third controlled valves 13, a collector 10 supplied by the pressure-reducing valve 9 in order to supply the at least one consumer member 3.

11 Claims, 4 Drawing Sheets

(56) References Cited

U.S. PATENT DOCUMENTS

| | | | | |
|---|---|---|---|---|
| 5,278,749 | A * | 1/1994 | De Man | A01G 25/16 239/69 |
| 7,325,567 | B2 * | 2/2008 | Heyden | B61K 7/08 137/271 |
| 8,640,702 | B2 * | 2/2014 | Cannon | A62B 9/02 128/204.29 |
| 2002/0153041 | A1 * | 10/2002 | Drube | G05D 7/0658 137/208 |
| 2008/0209916 | A1 * | 9/2008 | White | F17C 5/06 62/48.1 |
| 2010/0139777 | A1 | 6/2010 | Whiteman | |
| 2012/0012201 | A1 * | 1/2012 | Winchester | B01D 53/04 137/511 |
| 2020/0156924 | A1 * | 5/2020 | Thieu | B67D 7/36 |

FOREIGN PATENT DOCUMENTS

| | | |
|---|---|---|
| CN | 104948302 B | 6/2017 |
| CN | 109257936 | 1/2019 |
| WO | WO 2014105335 A1 | 7/2014 |
| WO | WO 2018206511 A1 | 11/2018 |
| WO | WO 2019102156 A1 | 5/2019 |
| WO | WO 2022023648 A1 | 2/2022 |

* cited by examiner

AERONAUTICAL DEVICE FOR DISTRIBUTING GAS

This application is the § 371 U.S. National Stage of International Application No. PCT/FR2023/050321, filed Mar. 9, 2023, which claims the priority French Patent Application No. FR2202235, filed Mar. 14, 2022.

The present invention relates to the aeronautical field.

Since its beginnings, aeronautics has used petrol engines with a high octane number. After 1945, the development of the jet engine and turbine led to the use of kerosene, the molecular mass of which is higher than that of petrol and the flammability of which is lower. These fuels are stored in reservoirs located in the wings, in the fuselage-wing connection or in the tail.

The trend towards reducing carbon dioxide gas emissions has led to engines consuming less. However, the gains on emissions of carbon dioxide gas are dwindling as certain technologies mature, in particular the speed at the end of the blade vanes. It has appeared more and more desirable to introduce a breakthrough.

Gas-aircraft projects have therefore arisen. The combustion of gases with a short or non-existent carbon chain where applicable with oxygen is little or non-polluting. On the other hand, storing $H_2$, $O_2$ or C1 or C2 gas, because of the small size of the gas molecule, is difficult and subject to risks of leaks.

On the ground, hydrogen, methane, ethane, ethylene, acetylene or oxygen are in general stored in containers that are under excessively high pressure, are too bulky and contain too much potential pressure energy to be loaded on board an aircraft or in welded and/or adhesively bonded cryogenic reservoirs. Cryogenic storage is limited to a limited period proportional to the volume stored.

Moreover, the gas stored in the liquid state cannot be used by an internal or external combustion engine or a fuel cell. The end consumption requires gas in a temperature range and a pressure range specified by the manufacturer of the consumer member.

The need has arisen to store the gas in an aircraft for consumption thereof on board.

The invention proposes an aeronautical device for distributing gas in an aircraft between at least one source of liquefied gas and at least one gas-consumer member. The device comprises at an least one first controlled all-or-nothing valve at the output of each source of liquefied gas, a cryogenic distributor connected to each first controlled valve and supplied with liquid, second controlled all-or-nothing valves connected to the cryogenic distributor, in parallel, two-phase buffer reservoirs supplied with liquid, each via one of said second controlled valves, and supplying gas, third controlled valves, mounted at the output of each buffer reservoir, for supplying gas, a pressure-reducing valve mounted at the output of the third controlled valves, and a collector supplied by the pressure-reducing valve to supply said at least one consumer member. By virtue of the invention, the aeronautical gas-distribution device can provide the aircraft, via the volume contained in the buffer reservoirs, necessary autonomy independently of the state of the source of liquefied gas. The buffer reservoirs can be designed for a gas pressure of several hundred bars, a selected gas pressure nevertheless being supplied to the consumer members.

Unlike the space field, where a cryogenic valve is used once and does not need to be closed again, closable valves are provided, for example solenoid valves.

In one embodiment, the device comprises fourth controlled valves mounted at the output of each pressure-reducing valve, to supply gas. The consumer member or members, for example the engines or an auxiliary for generating electrical energy on board, can be supplied from a single one of the buffer reservoirs, no matter which.

In one embodiment, the device comprises at least one compressor supplied by at least one of the buffer reservoirs, and at least one fifth controlled valve mounted between the compressor and said buffer reservoir. The buffer reservoir can be emptied sufficiently so as to increase the quantity of gas available for the consumer members and to bring the buffer reservoir to a pressure at the end of emptying below the normal pressure in the cryogenic reservoir designated at this moment for filling. The normal pressure in the cryogenic reservoir is equal to the pressure in the distributor when the corresponding first valve is open and, where applicable, the other first valves closed. The buffer reservoir is then filled with gas by operating the cryogenic valve under the effect of the pressure difference. Dispensing with a cryogenic pump affords a saving in mass and a reduction in the risk of accident.

In one embodiment, the device comprises a control unit controlling the at least one first controlled valve for sequential filling of the buffer reservoirs by pressure difference and sequential emptying of the buffer reservoirs. Sequential operation makes it possible to make independent the number of cryogenic reservoirs and the number of buffer reservoirs. At least one cryogenic reservoir is provided. At least two, preferably three, buffer reservoirs are provided.

In the case of two buffer reservoirs, one is in the process of emptying while the other is in the process of filling or gasification by heating the gas.

In the case of three or more buffer reservoirs, one is in the process of emptying while the second is in the process of filling and a third is in the process of gasification by heating the gas or already filled with gas at the planned pressure. Gasification requires a time dependent on the quantity of liquid brought into the buffer reservoir, on the external temperature liable to range from −55° C. at altitude to +60° C. on the ground and on the speed of the aircraft, in particular. The duration of the gasification and the quantity of liquid admitted into the buffer reservoir can be the subject of estimative prediction.

During gasification, if the corresponding buffer reservoir exceeds a maximum pressure, then the control unit can demand switching to discharge the overpressurised buffer reservoir and to momentarily interrupt the emptying of another buffer reservoir, and then resume the prior operation at the detected overpressure.

In one embodiment, for emptying one of the buffer reservoirs, the control unit controls the third controlled valves for gas flow by pressure difference initially, and then secondly by actuating a compressor until a pressure is obtained in said buffer reservoir lower than the pressure existing in the cryogenic distributor. The operation of the compressor is limited in time, giving rise to a saving in energy.

In one embodiment, the at least one first valve and the second valves are cryogenic. The other valves have gas passing through them at less low temperature, for example approximately −55° C. at altitude.

In one embodiment, the device comprises a flow meter disposed at the output of each source of liquefied gas. Measuring the liquid flow rate makes it possible to manage the opening time of the first and second valves and the distribution device to supply a required quantity.

In one embodiment, additional flow meters are advantageously disposed at the input of the buffer reservoirs.

In one embodiment, an assembly comprises a device described above and at least one single cryogenic source of liquefied gas. One of the cryogenic reservoirs can be in the process of emptying to fill a buffer reservoir while the other cryogenic reservoir or reservoirs are inactive. In the case of overpressure in a cryogenic reservoir, priority emptying to the distribution device can be provided.

In one embodiment, the aeronautical method for distributing gas in an aircraft between at least one source of liquefied gas and at least one gas-consumer member comprises a step of filling a buffer reservoir with liquefied gas via at least one from at least one first controlled all-or-nothing valve at the output of each source of liquefied gas, a cryogenic distributor connected to each first controlled valve, supplied with liquid by the cryogenic distributor, one from the second controlled all-or-nothing valves connected to the cryogenic distributor in parallel, said buffer reservoir being connected to said second open controlled valve and the other second controlled valve or valves being closed, a third controlled valve mounted at the output of said buffer reservoir being closed, and a step of emptying said buffer reservoir, said second controlled valve being closed and said third controlled valve being open, the gas flowing via a pressure-reducing valve mounted at the output of said third controlled valve to supply said at least one consumer member. Using all-or-nothing valves makes it possible to control the quantity of liquid passed by the valve by the duration of opening.

In one embodiment, in normal operation, a first buffer reservoir is in the process of filling with liquid by pressure balancing via one of the at least one first open valve and the second valve corresponding to said open first buffer reservoir, the third valve corresponding to said first buffer reservoir being closed, while a second buffer reservoir is in the process of supplying pressurised gas, the second valve corresponding to said closed second buffer reservoir, the third valve corresponding to said first buffer reservoir being open. This mode is adapted for two buffer reservoirs.

In one embodiment, a third buffer reservoir is in the process of gasification, the second valve corresponding to said third buffer reservoir being closed, the third valve corresponding to said third buffer reservoir being closed. This mode is adapted for three or more buffer reservoirs.

In one embodiment, the step of emptying said buffer reservoir comprises a substep of emptying by a pressure-reducing valve to reduce the gas pressure to the pressure required by the consumer member, and then a substep of pump-assisted emptying for bringing the gas pressure to the pressure required by the consumer member and to bring the pressure in said buffer reservoir at the end of emptying to a value below the pressure existing in the cryogenic distributor. More complete emptying of the buffer reservoir is obtained.

In one embodiment, the capacity of the buffer reservoirs is calculated to ensure flight range for the aircraft in accordance with current standards for the case of an accident affecting the energy reserve, in particular on one buffer reservoir if two buffer reservoirs are present, and on two buffer reservoirs if three buffer reservoirs are present.

Other features and advantages of the invention will emerge from the examination of the following detailed description and accompanying drawings, on which:

The accompanying drawings can not only serve to supplement the invention but also contribute to the definition thereof, where applicable.

The aeronautical gas-distribution device is designed to be carried by an aircraft: aeroplane, drone, helicopter, etc. The aeronautical gas-distribution device is supplied with liquid and supplies gas at a selected pressure. In other words, the fuel or oxidant is stored at very low temperature in liquid form in a cryogenic reservoir. By way of embodiment, gaseous hydrogen at 0° C. and 1 atmosphere has a density approximately 800 times lower than liquid hydrogen at −253° C., and therefore a volume approximately 800 times greater. A cryogenic reservoir is unsuitable for withstanding high pressures, in particular above 10 bars.

The gas stored is selected from hydrogen, methane, ethane, ethylene, acetylene and oxygen.

Moreover, maintenance rules require it to be possible to dismantle and repair or replace the majority of parts of the aircraft. Thus an aircraft is capable of setting down in any place—aerodrome for an aeroplane, landing pad for a helicopter—adapted to its weight and its requirements for landing but not provided with maintenance equipment specific to the model of the aircraft. In the case of damage being detected, the aircraft is configured to be repaired, permanently or temporarily, or disassembled so as to replace or repair a defective component, in accordance with the manuals and documents of the constructor approved by the air safety authorities. It is desirable for the component to be easily accessible to a maintenance operator. In the case of replacement, it is desirable for the component to be as small as possible for easy handling and transport. In the case of repair, it is desirable for the component be repairable by tried and tested tools and methods normal in the aeronautical field.

An aircraft is subject to daily, weekly, etc inspections, immobilising the aircraft for a period that is the inverse of the frequency.

The aeronautical gas-distribution device is thus subject to such requirements.

The Applicant has identified a need for distributing gas from aeronautical cryogenic reservoirs whether they be connected to the structure of the aircraft structurally, installed in the aircraft or carried by the aircraft.

From another point of view, aeroplanes are currently subject to a rule of maximum distance from a landing runway expressed in hours of flight in accordance with ETOPS certification. This distance depends on the type of aeroplane.

Wishing to ensure a high level of safety as well as perception of safety by users, the Applicant has identified the need to fly even in the case of damage to a cryogenic reservoir requiring release of the gas contained into the atmosphere.

The aeronautical storage device aims to satisfy the complex requirement thus analysed by the Applicant.

Figure 1:
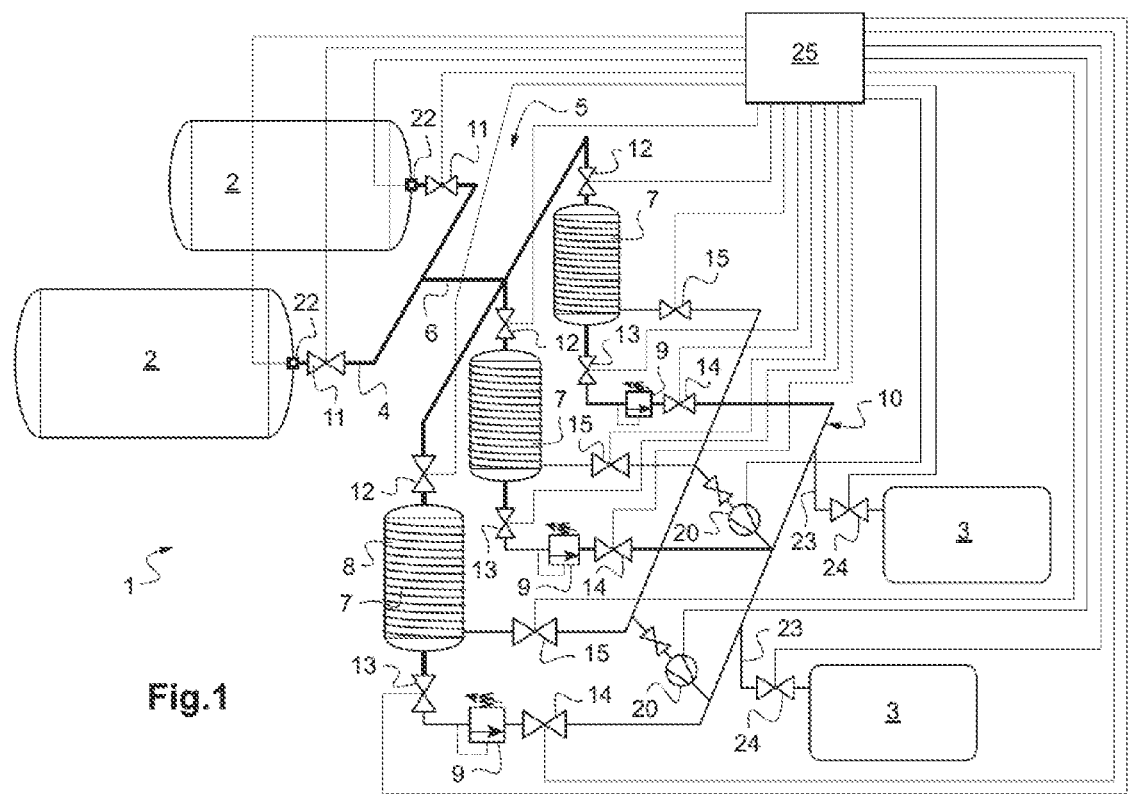
FIG. 1 illustrates schematically a device according to one aspect of the invention with two cryogenic reservoirs and three buffer reservoirs.

As illustrated on FIG. 1, the aeronautical gas-distribution device 1 installed in an aircraft is supplied by sources of liquefied gas 2 to supply gas to one or more consumer members 3. Here, two consumer members 3 have been shown, for example two engines, an electrical-energy generator or air heating. A flow meter 22 is disposed at the output of each source of liquefied gas 2.

The sources of liquefied gas 2 are composed of two cryogenic reservoirs disposed in parallel. Each cryogenic reservoir is provided with an output conduit 4. The terms upstream and downstream refer to the direction of flow of the fluid, liquid and then gas, in normal operation.

Each cryogenic reservoir is isolated to contain refined gas, for example liquid hydrogen at −253° C. Each cryogenic reservoir is capable of withstanding a maximum service pressure of the order of 6 to 10 bars.

The aeronautical gas-distribution device 1 comprises a first valve 11 for each cryogenic reservoir 2. The first valve 11 is mounted on the outlet conduit 4. The first valves 11 are controlled with an open position and a closed position. The intermediate positions of the first valves 11 are dynamic in that the first valves 11 are in movement while passing through said intermediate positions. In other words, the first valves 11 are of the all-or-nothing type. The first valves 11 can be disposed immediately downstream of the flow meters 22. Optionally, the flow meters 22 are downstream of the first valves 11.

The first valves 11 emerge in a cryogenic distributor 5. The cryogenic distributor 5 can comprise a common conduit 6 connecting the outputs of the first valves 11. The distributor is cryogenic in that it passes liquefied gas.

The cryogenic distributor 5 comprises a plurality of outputs, here three. On each of said outputs second valves 12 are mounted. The second valves 12 are controlled with an open position and a closed position. The intermediate positions of the second valves 12 are dynamic in that the second valves 12 are in movement while passing into said intermediate positions. In other words, the second valves 12 are of the all-or-nothing type. The second valves 12 are here three in number.

Downstream of each second valve 12 a central buffer reservoir 7 is mounted. Three buffer reservoirs 7 are provided in this embodiment. Each temporary storage reservoir 7 also serves as a gasifier. Insulation can be avoided. Each buffer reservoir 7 receives liquid and supplies gas downstream. A pressure rise or gasification step takes place in each buffer reservoir 7 between filling and emptying. Each buffer reservoir 7 is capable of withstanding a maximum service pressure of the order of 300 to 1000 bars. Each buffer reservoir 7 is designed to operate in a temperature range from −253° C. to +60° C. The buffer reservoirs 7 are two-phase over some of the operating steps and gaseous single-phase over the other operating steps. Each buffer reservoir 7 can be equipped with a heating member 8.

Downstream of each buffer reservoir 7 a third valve 13 is installed for supplying gas and a pressure-reducing valve 9 downstream of the third valve 13. The pressure-reducing valve 9 clips the pressure to supply gas at a consumption pressure fixed by the manufacturer of the consumer member 3. The pressure-reducing valve 9 is active when the pressure in the buffer reservoir 7 is higher than the consumption pressure and inactive otherwise. The consumption pressure is lower than the maximum pressure of the buffer reservoir 7. The consumption pressure is independent of the maximum pressure of the cryogenic reservoirs. The third valves 18 are of the all-or-nothing type.

Downstream of each pressure-reducing valve 9, a controlled fourth valve 14 can be provided. The fourth valves 14 are of the all-or-nothing type.

The fourth valves 14 or the pressure-reducing valves 9, depending on the option selected, emerge in a collector 10. The collector 10 can comprise a conduit connecting the outputs of the fourth valves 14 or of the pressure-reducing valves 9. The collector 10 passes gas. The collector 10 is connected towards downstream to conduits 23 supplying to the consumer members 3. In general, one supply conduit 23 is provided for each consumer member 3. Each supply conduit 23 can be equipped with a controlled supply valve 24. The supply valve 24 has a variable flow rate.

The gas-distribution device 1 comprises at least one compressor 20 connected to the collector 10. In general, two compressors 20 are provided in parallel for redundancy. The compressor 20 is electrical. The compressor 20 can be equipped with a controlled upstream valve. The compressor 20 discharges gas into the collector 10. In particular, the collector 10 consists of a conduit in the case of a single consumer member 3.

Downstream of each buffer reservoir 7 a fifth valve 15 is installed for supplying gas and a second collector downstream of the fifth valves 15. The second collector is connected to the compressor 20. The fifth valves 15 make it possible to isolate the buffer reservoirs 7 and the compressor 20. The fifth valves 15 are controlled. The fifth valves 15 are of the all-or-nothing type.

The compressor 20 increases the pressure to supply gas at a pressure equal to a consumption pressure fixed by the manufacturer of the consumer member 3. The consumption pressure is lower than the maximum pressure in the buffer reservoir 7. The compressor 20 makes it possible to take off gas from a buffer reservoir 7 the pressure of which is lower than the consumption pressure to supply the collector 10 and the consumer members 3. More complete emptying of the buffer reservoir 7 makes it possible to increase the range supplied by the gas contained in the buffer reservoir 7 or to reduce the volume of the buffer reservoir 7.

Emptying the buffer reservoir 7 sufficiently to bring the internal pressure of the buffer reservoir 7 to a value lower than the pressure in one of the cryogenic reservoirs makes it possible, during filling following the emptying, to transfer the liquid from the cryogenic reservoir to the buffer reservoir 7 by pressure difference. Thus the liquid in the cryogenic reservoir is sucked by the buffer reservoir 7 to pressure equilibrium. A cryogenic pump can be dispensed with, giving a saving in mass and energy consumed.

The aeronautical gas-distribution device 1 offers a combination of individual states of each cryogenic reservoir, of each buffer reservoir 7 and of each consumer member 3. Several consumer members 3 can be active simultaneously. In normal mode, a cryogenic reservoir is being emptied while the others are inactive and therefore closed. However, in some situations, for example to reduce the pressure in several cryogenic reservoirs, a particular mode can be provided in which several cryogenic reservoirs are being emptied. The buffer reservoirs 7 have a filling mode, a gasification mode, a gas storage mode and an emptying mode.

When one of the cryogenic reservoirs is being emptied, the corresponding first valve 11 is open and the other first valves 11 are closed. When one of the consumer members 3 is being supplied, the corresponding supply valve 24 is open.

When one of the buffer reservoirs 7 is in filling mode, the second valve 12 connected to said buffer reservoir 7 is open and at least one of the first valves 11 is open. The other second valves 12 are closed except in the case where simultaneous filling of two buffer reservoirs 7 is being implemented. The third valve 13 connected to said buffer reservoir 7 is closed. The fifth valve connected to said buffer reservoir 7 is closed.

When one of the buffer reservoirs 7 is in gasification mode, the second valve 12 connected to said buffer reservoir 7, the third valve 13 connected to said buffer reservoir 7 and the fifth valve 15 connected to said buffer reservoir 7 are closed. Gasification mode is of short duration, in particular in the case of hot ambient atmosphere and/or of heating of the buffer reservoir 7.

When one of the buffer reservoirs 7 is in emptying mode, the second valve 12 connected to said buffer reservoir 7 is closed. In the first part of emptying, the pressure in the buffer reservoir 7 is higher than the consumption pressure. The third valve 13 connected to said buffer reservoir 7 is open, the corresponding fourth valve 14 is open and the fifth valve connected to said buffer reservoir 7 is closed. The gas undergoes a reduction in pressure in the pressure-reducing valve 9 and is supplied to the collector 10 at the consumption pressure. The gas is next consumed by the consumer member or members 3.

At a given instant, among three buffer reservoirs 7, one is in filling mode, another in gasification and then storage mode and the third in emptying mode. As the modes have different durations, it is also possible to find two buffer reservoirs 7 in filling mode and the third in emptying mode or vice versa. It is also possible to find two buffer reservoirs 7 in storage mode and the third in emptying mode or vice versa.

In the embodiment, a flow meter 22 is disposed at the output of each source of liquefied gas 2. The flow meters 22 make it possible to know, with sufficient precision, the quantity of liquid supplied to such a buffer reservoir 7.

In the embodiment, the aeronautical gas-distribution device 1 comprises a control unit 25 receiving an external command, for example coming from the consumer members 3 or from a central control unit of the aircraft, and liquid flow rate data coming from the flow meters 22. The control unit 25 generates and sends commands to said first, second, third, fourth and fifth controlled valves and to the controlled supply valves 24. The commands can be "open" or "closed". The control unit 25 manages said combination of individual states.

In a variant, the first valves 11 can be replaced by at least one multiway valve having several inputs and one output. In this case, it is advantageous to provide a multiway valve with mixed positions, in particular at least one position of simultaneous emptying of two or more sources of liquefied gas 2 to reduce the pressure thereof while avoiding loss into the atmosphere.

In a variant, the second valves 12 can be replaced by at least one multiway valve having one input and several outputs, one per buffer reservoir 7. Said multiway valve forms a distributor.

In a variant, the pressure-reducing valves 9 are replaced by a single pressure-reducing valve 9, the third valves 13 emerging in the single pressure-reducing valve 9. In this case, the third valves 13 can be replaced by at least one multiway valve having several inputs and one output to the pressure-reducing valve. The fourth valves 14 are then replaced by a single fourth valve 14, where applicable non-controlled.

In a variant, the fifth valves 15 can be replaced by at least one multiway valve having several inputs, one per buffer reservoir 7, and an output to the compressor 20 or compressors 20. Said multiway valve forms a collector 10.

Figure 2:
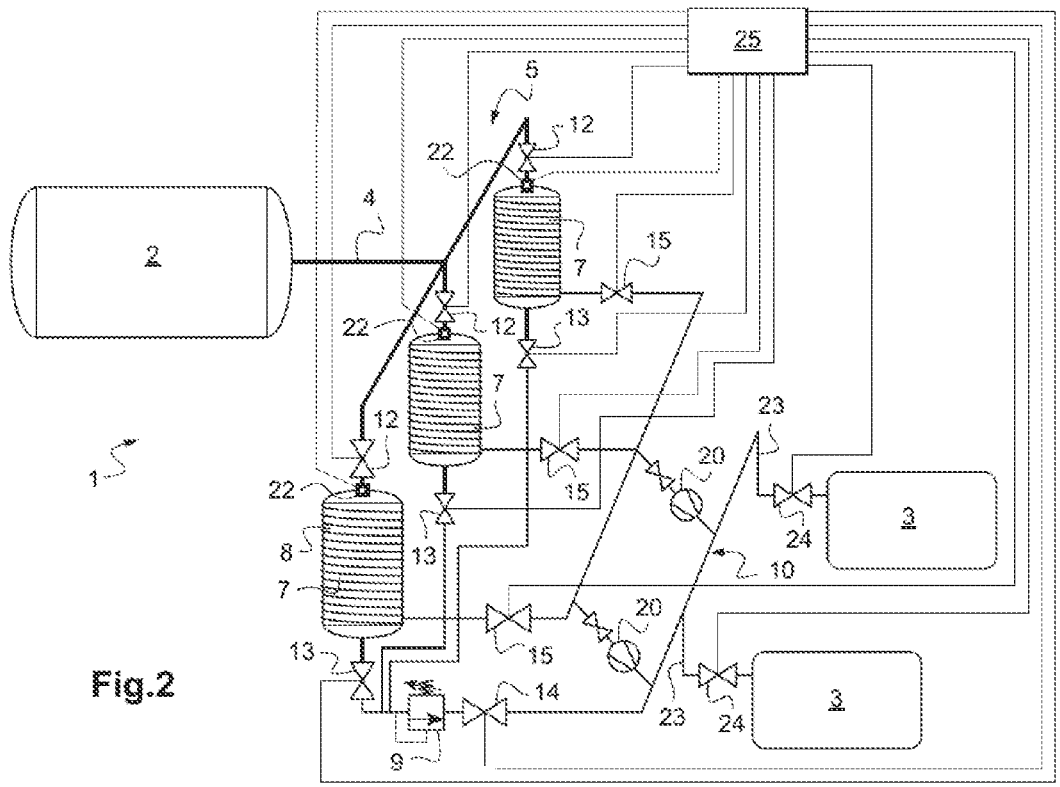
FIG. 2 illustrates schematically a device according to one aspect of the invention with one cryogenic reservoir and three buffer reservoirs.

In the embodiment shown on FIG. 2, the device is associated with a source of liquefied gas 2 for filling three buffer reservoirs 7 supplying two gas-consumer members 3. The first valves 11 can be omitted in that the second valves 12 suffice to direct the flow of liquid from the source of liquefied gas 2 to one of the buffer reservoirs 7.

Moreover, the pressure-reducing valve 9 is the only one. The fourth valve 14 is the only one. The pressure-reducing valve 9 is connected downstream of the third valves 13, here three in number for receiving pressurised gas from the buffer reservoir 7, the associated third valve 13 of which is open. This is also adapted to the case of FIG. 5 with two buffer reservoirs 7 instead of three. The single pressure-reducing valve 9 is also adapted to the other embodiments shown whatever the number of sources of liquefied gas 2 and the number of consumer members 3.

The flow meters 22 are disposed between the second valves 12 and the buffer reservoirs 7. Optionally, the meters 22 are disposed upstream of the second valves 12.

The compressors 20 are wirelessly remote-controlled by the control unit 25.

Figure 3:
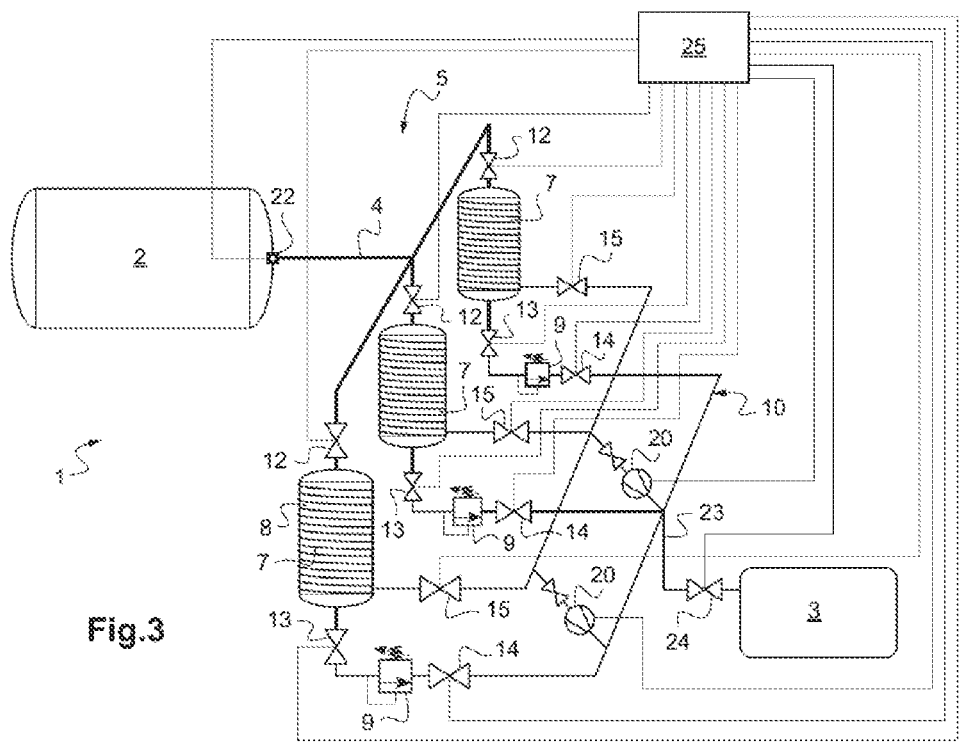
FIG. 3 illustrates schematically a device according to one aspect of the invention with one cryogenic reservoir and three buffer reservoirs.

In the embodiment shown on FIG. 3, the device is associated with a source of liquefied gas 2 for filling three buffer reservoirs 7 supplying a gas-consumer member 3, for example an engine. The first valve 11 can be omitted for the same reasons as with FIG. 2. The flow meter 22 is disposed at the output of the source of liquefied gas 2. The presence of three buffer reservoirs 7 ensures great autonomy for the aircraft in the case of a fault in the source of liquefied gas 2, a fault that may require emptying the source of liquefied gas 2. In addition, three buffer reservoirs 7 provide redundancy in that the device can operate satisfactorily with only two buffer reservoirs 7. The cryogenic distributor 5 can comprise a valve with one input and three outputs, one per buffer reservoir 7. The supply valve 24 associated with the consumer member 3 can be omitted, in particular if the valves associated with the compressors 20 are controlled.

This embodiment is well adapted to aircraft provided with two assemblies each comprising an aeronautical gas-distribution device 1 and at least one cryogenic source of liquefied gas. Each assembly can be mounted symmetrically in the aircraft, for example in the wings, under the wings, etc.

Figure 4:
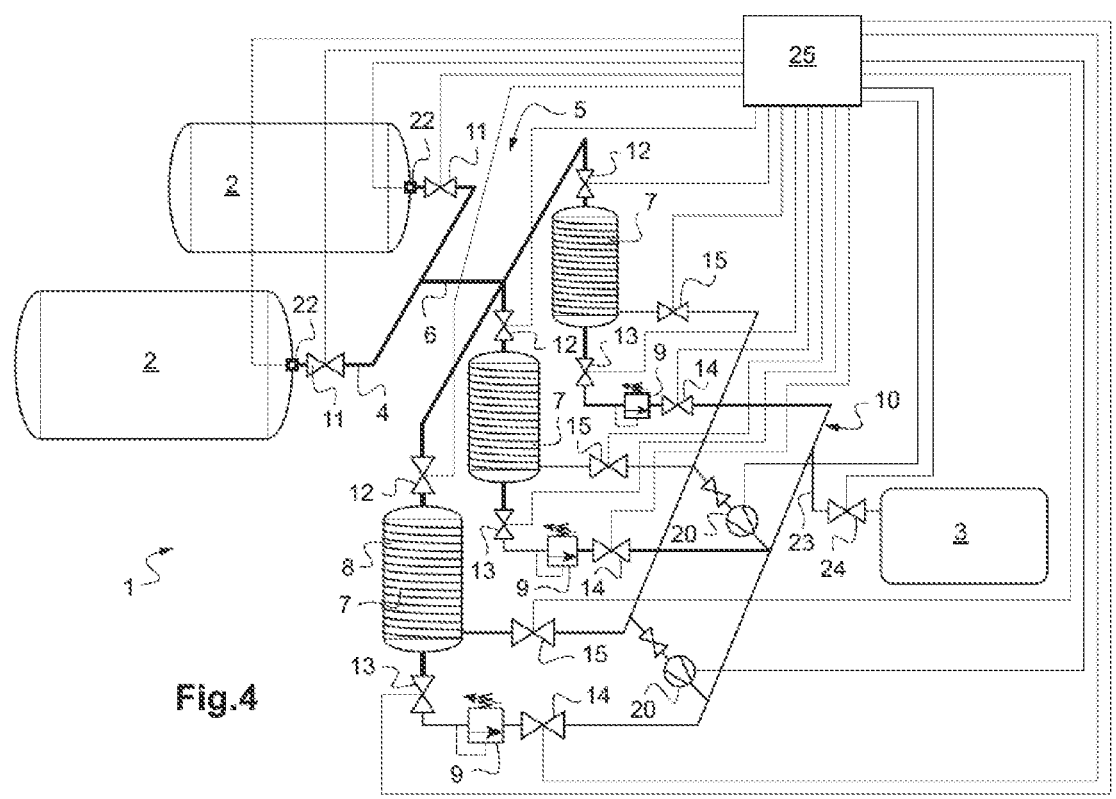
FIG. 4 illustrates schematically a device according to one aspect of the invention with two cryogenic reservoirs and three buffer reservoirs.

In the embodiment shown on FIG. 4, the device is associated with two sources of liquefied gas 2 for filling three buffer reservoirs 7 supplying a gas-consumer member 3.

Figure 5:
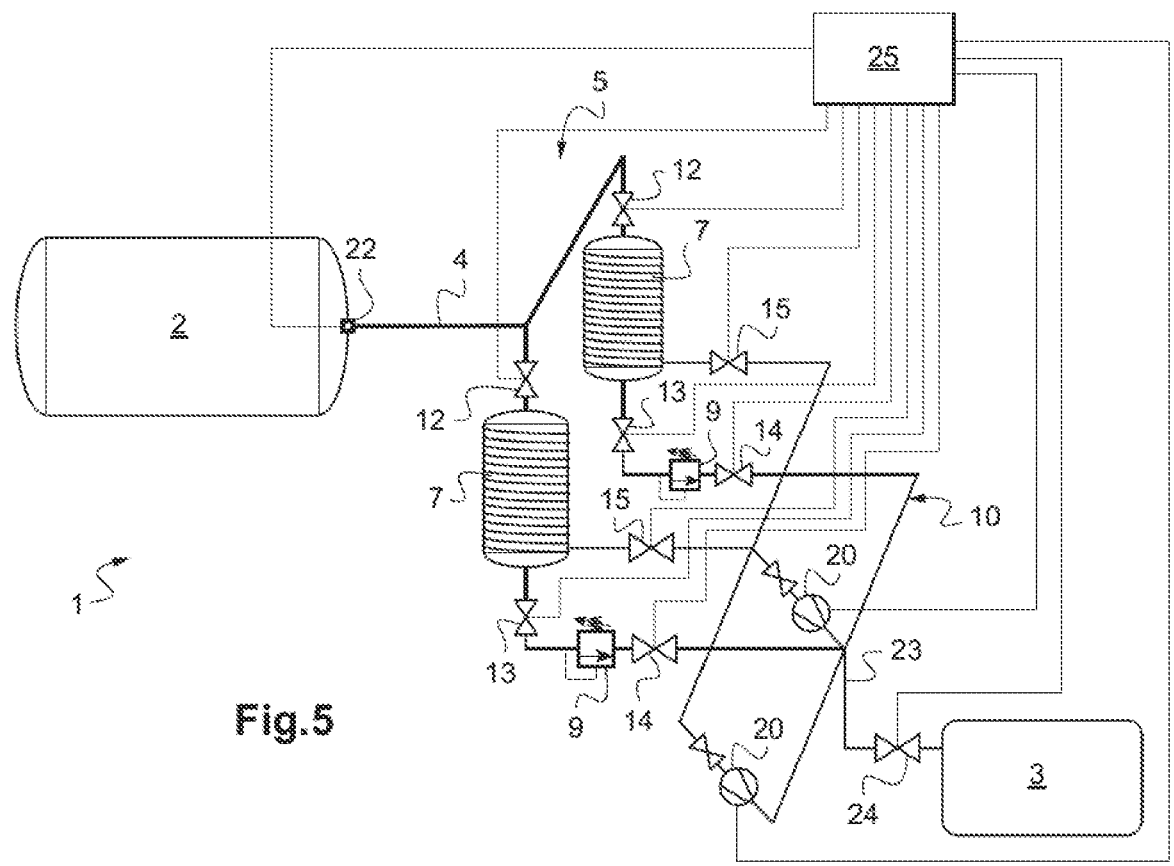
FIG. 5 illustrates schematically a device according to one aspect of the invention with one cryogenic reservoir and two buffer reservoirs.

In the embodiment shown on FIG. 5, the device is associated with a source of liquefied gas 2 for filling two buffer reservoirs 7 supplying a gas-consumer member 3. The first valve 11 can be omitted for the same reasons as with FIG. 2. The operation is then adapted. The duration of the gasification phase can be reduced, in particular by a heating member 8 for each buffer reservoir 7 or for the buffer reservoirs 7. Moreover, one of the buffer reservoirs 7 empties via the third valve 13 and then via the fifth valve 15 while the other one of the buffer reservoirs 7 fills with liquid and is then in gasification phase. The instant of switching between the third valve 13 and the fifth valve 15 is independent of the instant of closure of the second valve 12.

In general, the number X of cryogenic reservoirs, the number Y of buffer reservoirs 7 and the number Z of consumers are independent, with $X \geq 1$; $Y \geq 2$; $Z \geq 1$.

The volume capacity of each buffer reservoir 7 is between 10 and 20% of the volume capacity of each source of liquefied gas 2.

The cryogenic reservoirs 2 being subject to evaporation of liquefied gas, a gas-collection circuit can be provided in the top part of the cryogenic reservoirs 2. The collection circuit can be active above a threshold pressure via a calibrated-pressure valve. The collection circuit comprises a compressor for reinjecting the gas downstream, for example between the fifth valves 15 and the compressor 20.

Optionally, additional flow meters are disposed at the input of each buffer reservoir. Redundancy of measurement of liquid flow rate is ensured.

The first valves 11 can be monostable or bistable. The first valves 11 can be controlled for opening with a duration corresponding to a filling of one of the buffer reservoirs 7, or in pulse width modulation. The second valves 12 can be monostable or bistable. The second valves 12 can be controlled for opening with a duration corresponding to a filling of one of the buffer reservoirs 7, or in pulse width modulation.

The invention claimed is:

1. An aeronautical device for distributing gas in an aircraft between at least one source of liquefied gas and at least one gas-consumer member, comprising
    at least one first controlled all-or-nothing valve at an output of each source of liquefied gas,
    a cryogenic distributor connected to each first controlled valve, and supplied with liquid, second controlled all-or-nothing valves connected to the cryogenic distributor in parallel, two-phase buffer reservoirs, supplied with liquid, each by one of said second controlled valves, and supplying gas,
    third controlled valves, mounted at the output of each buffer reservoir, for supplying gas, a pressure-reducing valve mounted at the output of the third controlled valves,
    a collector supplied by the pressure-reducing valve to supply said at least one gas-consumer member.

2. The device according to claim 1, comprising fourth controlled valves mounted at the output of each pressure-reducing valve, for supplying gas.

3. The device according to claim 1, comprising at least one compressor supplied by at least one of the buffer reservoirs, and at least one fifth controlled valve mounted between the compressor and said buffer reservoir.

4. The device according to claim 1, comprising a control unit controlling the at least one first controlled valve for sequential filling of the buffer reservoirs by pressure difference and sequential emptying of the buffer reservoirs.

5. The device according to claim 4, wherein, for emptying one of the buffer reservoirs, the control unit controls the third controlled valves for gaseous flow by pressure difference initially, then secondly by actuating a compressor and until a pressure is obtained in said buffer reservoir lower than the pressure existing in the cryogenic distributor.

6. The device according to claim 1, wherein the at least one first valve and the second valves are cryogenic and wherein a flow meter is disposed at the output of each source of liquefied gas, additional flow meters advantageously being disposed at an input of the buffer reservoirs.

7. A device comprising a device according to claim 1, and at least one single cryogenic source of liquefied gas.

8. An aeronautical method for distributing gas in an aircraft between at least one source of liquefied gas and at least one gas-consumer member, comprising
    a step of filling with liquefied gas one buffer reservoir from at least two buffer reservoirs, via at least one from at least one first controlled all-or-nothing valve, at an output of each source of liquefied gas, a cryogenic distributor connected to each first controlled valve, supplied with liquid by the cryogenic distributor, one from a second controlled all-or-nothing valves, connected to the cryogenic distributor in parallel, said buffer reservoir being connected to the open second controlled all-or-nothing valve and the other second controlled all-or-nothing valves being closed, a third controlled valve mounted at the output of said buffer reservoir being closed, and
    a step of emptying said buffer reservoir, said second controlled valve being closed and said third controlled valve being open, the gas flowing via a pressure-reducing valve mounted at the output of said third controlled valve for supplying said at least one gas-consumer member.

9. The method according to claim 8, wherein, in normal operation, a first buffer reservoir is in the process of being filled with liquid by pressure balancing via one of the at least one open first valve and the second valve corresponding to said open first buffer reservoir, the third valve corresponding to said first buffer reservoir being closed, while a second buffer reservoir is in the process of supplying pressurised gas, the second valve corresponding to said closed second buffer reservoir, the third valve corresponding to said first buffer reservoir being open, and
    a third buffer reservoir is in the process of gasification, the second valve corresponding to said third buffer reservoir being closed, the third valve corresponding to said third buffer reservoir being closed.

10. The method according to claim 9, wherein the step of emptying said buffer reservoir comprises a substep of emptying by a pressure-reducing valve to reduce gas pressure to the pressure required by the gas-consumer member, then a substep of pump-assisted emptying to bring the gas pressure to the pressure required by the gas-consumer member and to bring the pressure in said buffer reservoir at the end of emptying to a value lower than the pressure existing in the cryogenic distributor.

11. The method according to claim 8, wherein the step of emptying said buffer reservoir comprises a substep of emptying by a pressure-reducing valve to reduce gas pressure to the pressure required by the gas-consumer member, then a substep of pump-assisted emptying to bring the gas pressure to the pressure required by the gas-consumer member and to bring the pressure in said buffer reservoir at the end of emptying to a value lower than the pressure existing in the cryogenic distributor.

* * * * *